UNITED STATES PATENT OFFICE.

JOHN T. H. DEMPSTER, OF SCHENECTADY, NEW YORK, ASSIGNOR TO GENERAL ELECTRIC COMPANY, A CORPORATION OF NEW YORK.

ELECTRODE FOR ARC-LAMPS.

1,010,402.  Specification of Letters Patent.  Patented Nov. 28, 1911.

No Drawing.  Application filed December 10, 1903. Serial No. 184,662.

*To all whom it may concern:*

Be it known that I, JOHN T. H. DEMPSTER, a citizen of the United States, residing at Schenectady, county of Schenectady, State of New York, have invented certain new and useful Improvements in Electrodes for Arc-Lamps, of which the following is a specification.

The object of my present invention is the production of metallic electrodes giving luminous and highly efficient arcs.

In carrying out my invention I form a mixture containing titanium, preferably in the form of one or more of its oxids, with some comparatively good conducting metallic material which, preferably, also gives a luminous arc, such as iron, which may also be in the form of one or more of its oxids. To this mixture I may add a small quantity of some substance such as boric acid, potassium carbonate or the like, which serves as a flux for the other materials in the electrode.

The materials above mentioned, or their equivalents, may be combined in various proportions and electrodes formed from the combination in various ways, to obtain highly desirable results.

In particular I have found that an excellent form of the electrode can be produced in the following manner: A mixture containing 160 parts of the magnetic oxid of iron, 40 parts of the red oxid of iron, 15 parts of rutile and 1 part of boric acid is first formed, the various constituents being in a powdered condition. To this mixture enough water, containing preferably about 5 per cent. of glycerin, is added to render the mixture about as fluid as paint. The mixture is then thoroughly worked together, as by grinding it in a paint mill for several hours; at the end of that time the mixture is heated and enough water is driven off to give the mixture about the consistency of hard putty. Pencils or the like are then formed from the mixture by molding it or forcing it through dies. The red oxid of iron added to the mixture in the proportions above stated is advantageous, as its presence renders the plastic mass easier to mold or press into pencils. The pencils are first brought gradually up to the temperature of about 200 degrees C., in a drying oven or the like. This heating drives off the remainder of the moisture from the pencils. The glycerin in the water seems to decrease the rate of evaporation, which results in a more even drying throughout the body of the electrode than would otherwise be the case and thereby tends to minimize the liability of distortion or cracking of the pencils. After the drying operation the pencils are baked. In the baking operation the pencils may be packed in saggers and placed in a kiln in which the temperature is gradually brought up to 1100 degrees or 1200 degrees C., and maintained at that temperature for an hour or two and then gradually cooled down. The baking causes the red oxid of iron to be converted into magnetic oxid of iron. As practically all the moisture is driven out of the pencils in the preliminary baking operation at the comparatively low temperature specified, the pencils suffer little, if any, distortion in shape by the baking operation from which they come out in the form of dense, hard, homogeneous sticks.

The pencils formed in the manner hereinbefore described possess excellent light giving qualities. The presence of titanium oxid or oxids, by virtue of their titanium content, insures a luminous arc from which a large amount of white light radiates. The presence of the iron oxid adds much to the steadiness of the arc, and by reason of its metallic characteristics, to the conductivity of the electrode.

While the high efficiency of the electrodes results largely from the luminosity of the titanium in the arc it should be noted that the iron which enters the arc also gives luminosity to the same, the arc spectrum showing a predominance of the lines due to both titanium and iron.

The conductivity of the electrodes may be increased by incasing the pencils in thin shells of some metal, which is preferably iron. My invention, however, is not confined to this particular means for increasing the electric conductivity of the electrodes, although the use of a metal shell, and particularly of an iron shell, is my preferred means for accomplishing this result; thus, for instance, the porosity of the electrodes is decreased and their heat and electric conductivity increased by prolonging the period during which they are heated to a temperature which will cause a flowing together of the particles composing the electrodes.

The preparation of an electrode containing comparatively large amounts of metallic material which, in its ordinary form, is a good conductor of heat and electricity, in such a manner that the best heat conductivity of the electrode is comparatively poor may be quite desirable for some purpose, namely, for the purpose of maintaining the arcing end at a high temperature, whereby the electrode is consumed more evenly across its end surface. Obviously this feature of my invention is not limited to the materials specified.

Instead of forming the electrodes from an artificial mixture of titanium oxid and one or more of the oxids of iron I may employ natural titaniferous magnetite in which titanium oxid and iron oxid are combined in suitable proportions. In the natural titaniferous magnetite the titanium and iron are very intimately combined and very homogeneous electrodes can therefore be formed from it. When I employ natural titaniferous magnetite as the material out of which I make electrodes I usually find it necessary or, at least, desirable to purify it, particularly by removing more or less of the silicates which are usually found in it. The purification may be carried on in various ways known to those skilled in the art.

While I have described in detail electrodes formed in a manner and from materials proportioned to give highly advantageous results I do not intend that my invention in all its aspects shall be limited to the proportions or method given. In particular I found that the proportions of oxids of iron and titanium in the mixture from which the stick is made can be varied considerably; for instance, I have obtained very good results with electrodes in which substantially equal amounts of the iron and titanium oxids are employed.

In the foregoing description I use the word "metallic" as signifying a substance containing or having the characteristics of a metal, which produces an arc which is very different from the arcs produced by non-metallic electrodes, such, for example, as carbon electrodes.

What I claim as new and desire to secure by Letters Patent of the United States, is,—

1. A metallic arc light electrode yielding an arc in whose spectrum titanium and iron lines predominate.

2. A metallic arc light electrode, conducting at ordinary temperatures, containing titanium oxid.

3. A ferruginous arc light electrode, conducting at ordinary temperatures, containing titanium oxid.

4. An arc light electrode composed principally of a mixture of titanium oxid with ferruginous material.

5. A ferruginous arc light electrode conducting at ordinary temperatures containing at least seven per cent. of titanium oxid.

6. A metallic arc light electrode comprising a preponderating amount of ferruginous and titanic materials.

7. An arc light electrode composed principally of oxids of iron and titanium.

8. A metallic arc light electrode containing iron oxid, titanium oxid, and a flux therefor.

9. An arc light electrode composed principally of natural titaniferous magnetite.

10. An arc light electrode composed principally of purified natural titaniferous magnetite.

11. An arc light electrode containing a mixture composed principally of oxids of iron and titanium of which the titanium oxid forms at least seven per cent. of the whole.

12. An arc light electrode composed principally of a mixture of titanium oxid with some comparatively good conducting metallic material which in consuming gives a luminous or flaming arc.

13. An arc light electrode composed principally of a mixture of titanium oxid with some refractory not readily oxidized material which in consuming gives a flaming or luminous arc.

14. A metallic arc light electrode consisting of an iron shell filled with a mixture containing iron oxid and titanium oxid.

15. An arc light electrode composed principally of titanium oxid, iron oxid and iron.

16. An arc light electrode composed essentially of iron and compounds of iron and titanium yielding an arc in the spectrum of which the iron and titanium lines predominate.

17. An arc light electrode composed essentially of iron, iron oxid and a compound of titanium yielding an arc in the spectrum of which the iron and titanium lines predominate.

18. An arc light electrode metallic in composition containing titanium oxid.

19. An arc light electrode composed principally of a mixture of titanium oxid with a metallic substance having greater electric conductivity than said oxid.

20. An arc light electrode having as its principal constituents iron, titanium and oxygen.

21. An arc light electrode composed principally of a natural combination of iron, titanium and oxygen.

22. An arc light electrode metallic in composition and conducting at ordinary temperatures, containing not less than seven per cent. of titanium oxid.

23. An arc light electrode composed principally of a mixture of titanium oxid with a metallic material.

24. An arc light electrode composed largely of a mixture of compounds of iron and titanium yielding an arc in the spectrum of which the iron and titanium lines predominate.

25. An arc light electrode composed largely of a metallic conducting substance conglomerated with a titanium compound.

In witness whereof, I have hereunto set my hand this 7th day of December 1903.

JOHN T. H. DEMPSTER.

Witnesses:
 BENJAMIN B. HULL,
 MARGARET E. WOOLLEY.